United States Patent [19]

Vivian

[11] Patent Number: 4,645,617
[45] Date of Patent: Feb. 24, 1987

[54] STRIPPING COMPOSITIONS WITH REDUCED VAPOR CONTAINING MECL$_2$, A WAX AND ETHYLENE OR PROPYLENE CARBONATE

[75] Inventor: Thomas A. Vivian, Midland, Mich.

[73] Assignee: The Dow Chemical Company, Midland, Mich.

[21] Appl. No.: 815,955

[22] Filed: Jan. 3, 1986

[51] Int. Cl.$^4$ .................. C09D 9/00; C09D 9/02; C11D 7/50; C23D 17/00

[52] U.S. Cl. ..................................... 252/165; 134/38; 252/162; 252/163; 252/164; 252/170; 252/171; 252/DIG. 8

[58] Field of Search .............................. 134/38, 39, 40; 252/162, 163, 164, 165, 170, 171, DIG. 8

[56] References Cited

U.S. PATENT DOCUMENTS

| | | | |
|---|---|---|---|
| 2,935,479 | 5/1960 | Oberdorfer | 252/170 |
| 3,075,923 | 1/1963 | Berst | 252/144 |
| 3,094,491 | 6/1963 | Greminger | 252/171 |
| 3,189,553 | 6/1965 | Lange | 252/165 |
| 3,382,181 | 5/1968 | Oberdorfer | 252/170 |
| 3,574,123 | 4/1971 | Laugle | 252/144 |
| 4,508,634 | 4/1985 | Elepano | 252/163 |
| 4,579,627 | 4/1986 | Brailsford | 156/655 |
| 4,594,111 | 6/1986 | Coonan | 134/3 |

FOREIGN PATENT DOCUMENTS

| | | | |
|---|---|---|---|
| 2822126 | 11/1979 | Fed. Rep. of Germany | 252/DIG. 8 |
| 60-20982 | 2/1985 | Japan | 252/170 |

*Primary Examiner*—Dennis L. Albrecht
*Attorney, Agent, or Firm*—Glwynn R. Baker

[57] ABSTRACT

There is disclosed a composition of matter useful for stripping paint and varnish from substrates comprised of the conventional industrial chlorinated solvents, e.g. methylene chloride (dichloromethane) solvent and a wax, such as paraffin wax, which composition is improved by the addition thereto of a novel class of evaporation retarding chemicals resulting in a far more effective stripping action and a much improved environmentally desirable composition, with respect to the concentration of methylene chloride in the ambient atmosphere surrounding the work situs. The evaporation retarding chemical can be a surfactant, a resin plasticizer or ethylene or propylene carbonate.

3 Claims, No Drawings

STRIPPING COMPOSITIONS WITH REDUCED VAPOR CONTAINING MECL$_2$, A WAX AND ETHYLENE OR PROPYLENE CARBONATE

BACKGROUND OF THE INVENTION

The stripping of paint and varnish from various substrates, such as metal and/or wood, to enable the article or surface to be refinished has employed methylene chloride (dichloromethane) as the base solvent for a large variety of formulations for stripping paint and varnishes, both under industrial as well as home use. The normal additives, depending upon the degree of stability, shelf life, required have been caustic soda, ammonia, other amines, acetic acid as activators, petroleum sulfonates and other surface active materials have been added to assist in penetrating the film forming materials of the paints and varnishes. Water has been added to the point of saturating the formulation and the surface active materials of course assist in maintaining the water associated with the formulation dissolved, preventing it from phasing out. Most formulations contain a wax or similar material which is added to reduce the evaporation rate of the methylene chloride. Some formulations add a polar solvent such as methanol which the literature reports as an aid to reducing the stripping time.

The literature is filled with compositions and formulations which are purported to be substitutes for the methylene chloride based paint and varnish strippers a few of which have and still today serve a segment of industry. For example, the water based caustic formulated strippers as well as the hydrocarbon/caustic thickened compositions find utility in certain applications where to date the evaporative rate of the methylene chloride based strippers is too rapid for use, e.g. stripping of large or complex surfaces in the outdoor atmosphere. Each formulation has an advantage in some special industrial arena or work situs. However, the most universal base for strippers is still the methylene chloride/wax mixture where large vats may be filled and the article to be stripped of its coating is merely immersed into the liquid solvent formulation with or without agitation and remains in the bath for a predetermined time interval. Upon withdrawal of the article it is washed with water and/or brushed, wiped and/or flushed with water and/or fresh formulation. Since the use of large vats offers a large surface to the ambient atmosphere large quantities of the methylene chloride and/or the co-solvent such as methanol are lost. Even with the addition of the waxes the rate of evaporation is quite high. While methylene chloride is considered to be environmentally acceptable today, health problems could occur from overexposure. The American Council of Governmental and Industrial Hygienists (ACGIH) threshold limit values—time weighted average concentration for a normal 8 hour work day and a 40 hour work week, to which all workers may be repeatedly exposed, day after day, without adverse effect—for methylene chloride is 100 ppm. It would be most desirable from the human health standpoint to provide additives which would at least reduce the potential for greater exposure and most desirable to provide additives which would reduce the vapor potential to a considerable value less than the standard.

These and other advantages, will become apparent to those skilled in the art to which the invention pertains from the following description and examples.

BRIEF DESCRIPTION OF THE INVENTION

In accordance with the present invention it has now been found that the rate of evaporation of industrial chlorinated solvents, particularly methylene chloride in a formulation which includes therein a wax, such as a low melting paraffin wax, can be markedly improved with regard to the retardation of evaporation as well as improving other properties such as the stripping aspect by the addition of at least one of propylene carbonate, ethylene carbonate, and/or a plasticizer, such as dioctyl phthalate, or a mixture of two or more of these additives, particularly propylene carbonate. It has further been found that the addition of 0.5 to about 5% of a surface active material, such as an anionic surfactant, e.g. dioctyl sodium sulfo succinate, a non-ionic, e.g. alkylaryl ether, or silicone surfactant, e.g. U.C.C. L3510, to wax containing formulations will also retard the evaporation of the methylene chloride and organic co-solvents normally employed. It is to be understood that other additives commonly included in the many proprietary formulations now being sold by commercial formulators can also be included without detrimentally affecting the performance of the here described retardant chemicals. Experimentation has established that best results are obtained by limiting the amounts of the waxes added to between about 0.5 and about 5.0 percent by weight based on the total weight of the solvents, and preferably between about 1 to about 3% by weight, and the here described additives to between about 0.25 and about 5.0 percent by weight of the solvents and the waxes and preferably between about 1 and about 3% by weight. While greater amounts of wax may be used, effectiveness of the combination of wax and the here described retardant additive is reduced relative to the amount employed when the total level of retardant additives is raised above about 10 to 15 percent. Therefore, the preferred compositions of the present invention are those which contain from about 1 to about 3%, and, most preferably, those which contain from about 1.5 to about 2.5 percent by weight of one or more of the common waxes, such as paraffin wax having a melting point below about 150° F. and from about 0.25 to about 3 percent by weight, and, again most preferably from about 1.0 to about 2.5 percent by weight of at least one of propylene carbonate, ethylene carbonate, an anionic surface active material and/or a plasticizer. In addition a surface active agent may be added in an amount sufficient to solubilize water in excess of the solubility limits of the solvents, thereby to assist in the prevention of corrosion of metals in storage vats and containers.

As has been above stated the preferred essential additive to the existing wax containing formulations is the alkylene carbonate(s), ethylene and/or propylene carbonates. Of course if the formulator does not initially add wax to his formulation then it is essential that the wax be included as an additive under this invention. While the surfactant and other plasticizer additives individually and in combination are useful they do not contribute as much evaporative retardation to the formulation as do the carbonates. They have however been found to give added benefits when employed in combination with the carbonates in formulations.

The presence of alkali metal hydroxides, ammonia and other amines both aliphatic and aromatic in nature, or the phenols, as well as contact with inorganic salts such as $AlCl_3$, $FeCl_3$ or $ZnCl_2$ should be avoided since various well known reactions occur between these materials and the carbonate(s) as well as the methylene chloride, the latter in the presence of water, catalyzing the degradation of the methylene chloride. As is well known it is next to impossible to exclude moisture in and around the situs and solvents such as methylene chloride and the alcohols have a propensity for picking up moisture.

In its broadest sense the invention is in the discovery that the addition of small but effective amounts of at least one of ethylene carbonate and/or propylene carbonate to the basic paint and varnish stripping formulation consisting of methylene chloride and a wax can effectively reduce the rate of evaporation of the solvents, particularly methylene chloride and its often employed polar co-solvent methanol, by a factor of twenty.

As has been discussed, the addition of the surface active agents and/or the plasticizers alone or in combination with each other are less effective than the carbonates alone, but, still the use of these materials offer advantages under conditions where their retardation effects can be tolerated.

The most preferred compositions are those which contain the carbonate and one or the other of the plasticizers or surface active agents.

DETAILED DESCRIPTION OF THE INVENTION

A series of runs were made to determine the effectiveness of various additives to methylene chloride based wax containing paint and varnish stripping formulations to retard the evaporation of the methylene chloride and where used in combination with polar solvents such as the alcohols to effectively retard evaporation of these additive solvents also. The tests were run in a two foot square box having one side open to the ambient atmosphere. The procedure was to prepare a 100 gram sample of the desired formulation, taking a 25 cc aliquot therefrom and place it in the tared aluminum weighing dish on a balance located in the box. The vapor concentration was measured at a point about nine inches above the tared dish. The results obtained using several formulations and a blank are reported in Table 1.

| Additive | Amt. % by wt. | Formulation Cumulative Loss in g/sq. ft./min. Time | | | | | | | | | % Loss Days | |
|---|---|---|---|---|---|---|---|---|---|---|---|---|
| | | 1 | 2 | 3 | 4 | 5 | 10 | 15 | 30 | 60 | 1 | 2 |
| None[1] | — | 15 | 15 | 14 | 14 | 13 | 12 | 12 | 11 | 9.8 | 100 | — |
| None | — | 16 | 16 | 14 | 14 | 12 | 11 | 10 | 9.8 | 8.9 | | |
| Wax | 5 | — | — | 0.12 | 0.087 | 0.069 | 0.10 | 0.12 | 0.22 | 0.42 | 48 | 80 |
| | 2.5 | 0.35 | 0.17 | 0.12 | 0.17 | 0.14 | 0.14 | 0.16 | 0.23 | 0.20 | 43 | |
| | 1.5 | 12 | 7.6 | 5.3 | 4.0 | 3.2 | 1.8 | 1.4 | 0.77 | 0.59 | 47 | |
| | 1.0 | 12 | 7.6 | 5.3 | 4.1 | 3.4 | 2.0 | 1.6 | 1.5 | 1.4 | 56 | |
| | 0.5 | 14 | 14 | 13 | 12 | 9.4 | 5.0 | 4.7 | 3.5 | — | 70 | |
| PC | 5 | 12 | 12 | 11 | 10 | 9.9 | 8.7 | 9.4 | 8.3 | — | | |
| | 2.5 | 12 | 11 | 10 | 10 | 9.6 | 8.0 | 8.2 | — | — | | |
| | 1.0 | 16 | 14 | 13 | 12 | 12 | 10 | 9.5 | 8.6 | 8.0 | | |
| Wax PC | 1.5 1.0 | * | * | * | 0.087 | 0.069 | 0.035 | 0.023 | 0.035 | 0.029 | | |
| Wax EC | 2.5 2.5 | .35 | .17 | .12 | .087 | .14 | .10 | .14 | .16 | .28 | 20 | 51 |
| Wax EC | 1.5 1.5 | 1.7 | 1.2 | 1.0 | 0.95 | 1.0 | 0.87 | 0.85 | 0.74 | 0.76 | | |
| EC | 5 | 13 | 12 | 13 | 12 | 11 | 11 | 9.9 | 8.9 | — | | |
| | 2.5 | 17 | 15 | 14 | 13 | 13 | 11 | 10 | 9.3 | 8.6 | | |
| | 1.0 | 15 | 14 | 13 | 12 | 11 | 11 | 9.7 | 8.7 | — | | |
| 1% Propylene Carbonate/1.5 Wax | | 7.3 | 3.6 | 2.4 | 1.8 | 1.5 | 0.8 | 0.58 | 0.41 | 0.32 | | |
| 1% Aerosol OTS[2] 1.5% Wax | | 3.5 | 1.9 | 0.95 | 1.0 | 0.83 | 0.52 | 0.46 | 0.35 | 0.46 | | |
| 1.0% Witconate KX 1.5% Wax | | 1.7 | 2.6 | 2.8 | 2.8 | 2.8 | 2.6 | 2.4 | 2.6 | 2.6 | | |

[1]All carried out @ 18°–19° C. except 1% Aerosol OTS.
[2]Carried out @ 24° C.

As is readily seen wax as the sole additive rapidly loses its effectiveness when employed in amounts less than 2.5%, with only a marginal improvement over non-wax containing formulations at 1.5%. Also shown is that the addition of either propylene carbonate or ethylene carbonate alone is not as effective as wax alone. However, when one of the additives are employed in combination with wax, the improvement is marked.

In another series of tests commercial formulation containing 75.8% by weight methylene chloride, 2.3% toluene, 0.1% wax, 0.8% methocel F4M-PR, 20% glacial acetic acid and 1.0% water was purchased and used to strip an epoxy paint from metal panels. Propylene carbonate, 1.0% by weight and wax, 1.5% by weight, were added and the resulting compositions tested after 1 minute, 2 minutes and 4 minutes contact with the panel, the panel weight weight loss and vapor concentration were measured.

In another test a commercial paint stripper purchased from a local store was divided in half and a lab cart marked in half sections, placed in a 9×11 foot non-ventilated room with 8 foot ceilings and one half of the cart stripped with the unaltered commercial formulation, and the methylene chloride concentration measured during stripping. The concentration of methylene chloride was 376 parts per million. After ventilating the room to remove all vapors, the test procedure was repeated using the other half of the commerical stripper to which had been added 1.0% by wt. propylene carbonate and 1.5% by wt. wax. The other half of the cart was stripped and the concentration of the vapors in the room were measured and found to be 107 ppm.

I claim:

1. An improvement composition useful for stripping paint and varnish and polymeric resins from surfaces comprising a major portion of methylene chloride, 0 to 50% by wt. of a polar organic solvent, 0.5 to about 5.0% by wt. of a natural or synthetic wax and at least one of the following additive components in amounts of from 0.25 to about 5.0% by wt. each: ethylene carbonate or propylene carbonate.

2. The improved composition of claim 1 wherein the additive is propylene carbonate.

3. The composition of claim 1 wherein the additive is ethylene carbonate.

* * * * *